Jan. 29, 1963     O. K. KELLEY     3,075,691
FAN CLUTCH
Filed Feb. 8, 1960     3 Sheets-Sheet 1
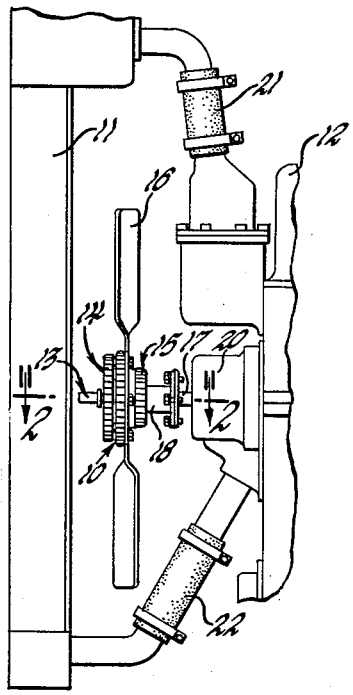
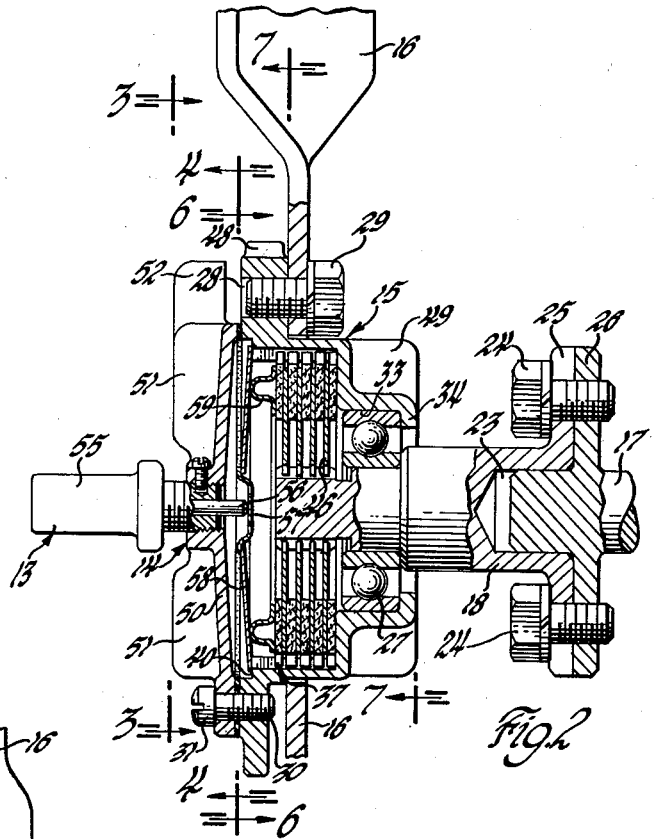
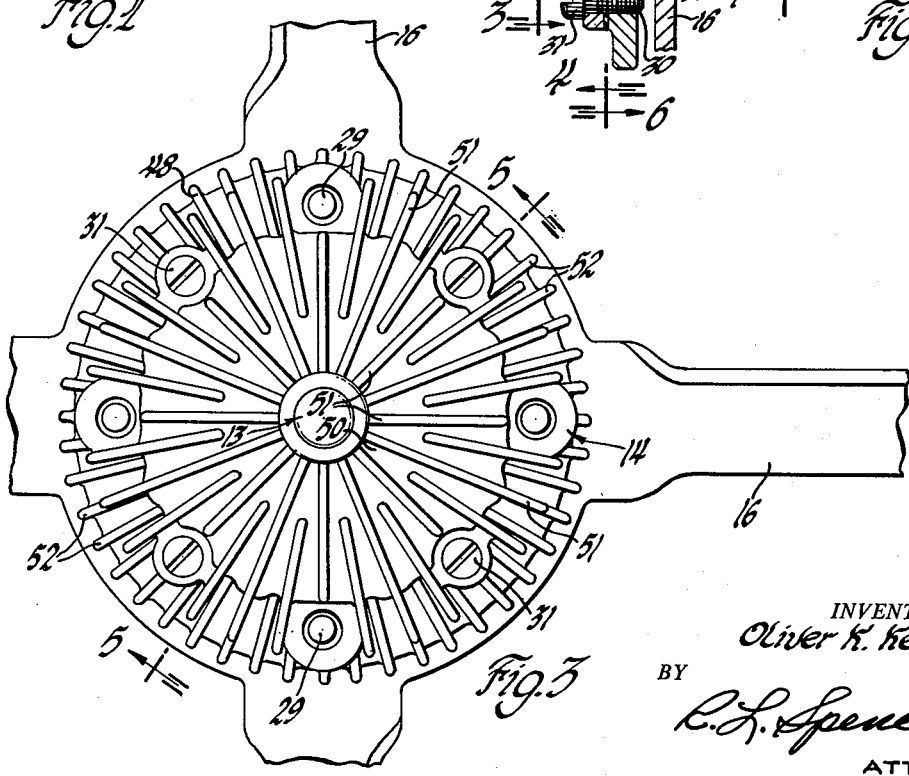
INVENTOR.
Oliver K. Kelley
BY
R. L. Spencer
ATTORNEY

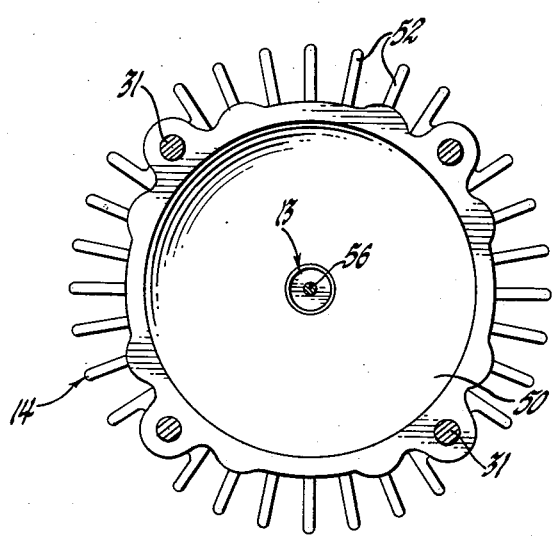
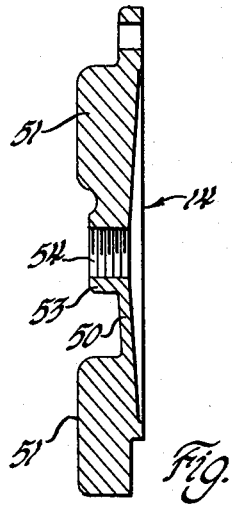
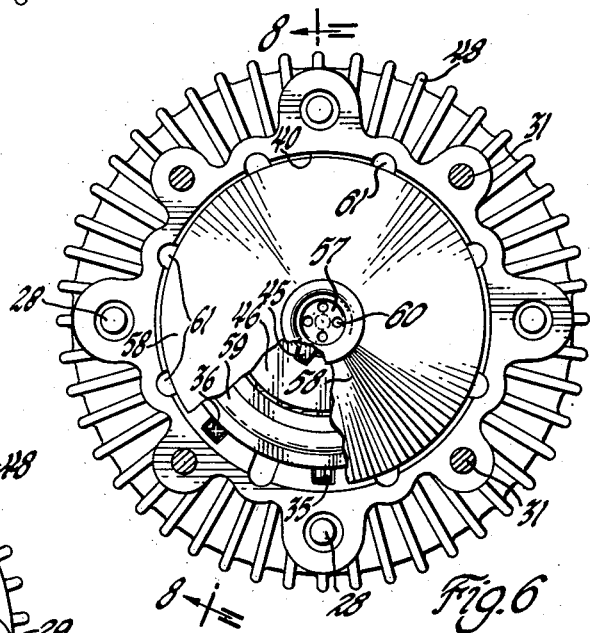
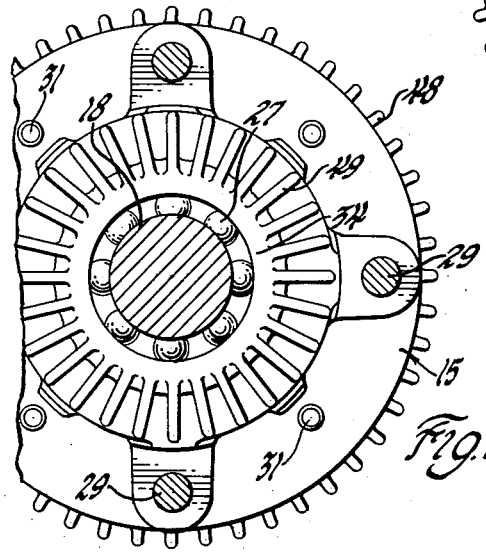

Jan. 29, 1963     O. K. KELLEY     3,075,691

FAN CLUTCH

Filed Feb. 8, 1960     3 Sheets-Sheet 3

INVENTOR.
Oliver K. Kelley
BY
C. L. Spencer
ATTORNEY

United States Patent Office 3,075,691
Patented Jan. 29, 1963

1

3,075,691
FAN CLUTCH
Oliver K. Kelley, Bloomfield Hills, Mich., assignor to General Motors Corporation, Detroit, Mich., a corporation of Delaware
Filed Feb. 8, 1960, Ser. No. 7,451
17 Claims. (Cl. 230—270)

This invention relates to fan drives and more particularly to a friction fan drive for a motor vehicle fan wherein the fan may be driven at different speeds as determined by cooling requirements.

In fan drives for motor vehicles it is desirable that the fan be capable of being driven at various speeds of rotation with respect to the speed of the vehicle engine in order to reduce both power consumption and fan noise. Various fan devices for achieving such results heretofore proposed have been expensive to manufacture and maintain, have been jerky in operation, or subject to other deficiencies preventing their adaption for general commercial use.

An object of this invention is to provide a variable speed friction fan drive which is very compact in structure, inexpensive to manufacture, and simple to maintain.

Another object of this invention is to provide a friction drive for a fan wherein the fan speed may be automatically varied in accordance with cooling requirements.

A further object of this invention is to provide a friction drive for a fan having a driven fan hub and cover provided with very large heat radiating surfaces in relation to the quantity of the metal in the hub and cover.

An additional object of this invention is to provide a variable speed friction fan drive incorporating friction clutch elements and having a fan hub rotatably supported upon a drive shaft and adapted to be driven at different speeds with respect to the speed of rotation of the drive shaft by controlling the pressure applied to the clutch elements in accordance with changes in cooling requirements.

A further object of this invention is to provide a friction fan drive adapted to limit the maximum fan speed and capable of continuous operation with the friction elements in slipping engagement and providing a long useful life of the friction elements.

Another object of this invention is to provide a friction fan drive for a fan rotatably supported upon a drive shaft and having friction clutch elements effective in one condition of operation to disconnect the fan from the drive shaft, effective in a second condition of operation to drive the fan at the speed of rotation of the drive shaft, and effective in a third condition of operation to limit the maximum fan speed to a predetermined speed when the speed of the drive shaft exceeds the maximum predetermined speed.

An additional object of this invention is to provide a variable speed friction fan drive having a fan hub rotatably supported upon a drive shaft having friction elements adapted to be engaged, released, and operated in continuous slipping engagement, and wherein a temperature responsive power element is adapted to apply force tending to engage said friction elements through the medium of a diaphragm spring.

A more particular object of this invention is to provide a friction fan drive for a fan supported for rotation on a drive shaft having engageable and releasable clutch plates and incorporating a temperature responsive power element adapted to apply force to the clutch plates through a Belleville spring, wherein the Belleville spring is arranged to limit the force which may be applied to the clutch plates such that the speed of rotation of the fan is limited to a maximum permissible speed when the

2 speed of rotation of the drive shaft exceeds such maximum permissible speed.

These and other objects of this invention will be apparent from the following description and claims, taken in conjunction with the accompanying drawings in which:

FIGURE 1 is a view in side elevation of the front end of an engine illustrating a fan drive of the type disclosed, positioned between a vehicle radiator and the engine;

FIGURE 2 is a sectional view of the friction fan drive taken along the line 2—2 of FIGURE 1;

FIGURE 3 is an end view of the friction fan drive assembly as viewed along the line 3—3 of FIGURE 2;

FIGURE 4 is an end view of the fan drive assembly cover taken along the line 4—4 of FIGURE 2 and illustrating the inside of the cover;

FIGURE 5 is a sectional view through the fan drive assembly cover taken along the line 5—5 of FIGURE 3;

FIGURE 6 is an end view of the fan assembly with the cover removed, taken along the line 6—6 of FIGURE 3, with a part of the diaphragm spring broken away;

FIGURE 7 is an end view of the assembly taken along the line 7—7 of FIGURE 3;

Figure 8:
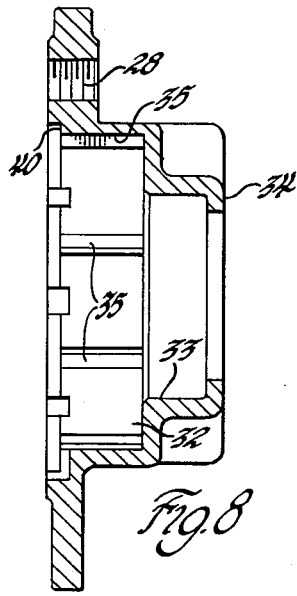
FIGURE 8 is a sectional view of the fan hub taken along the line 8—8 of FIGURE 6.

Referring to FIGURE 1, there is shown a fan assembly generally indicated at 10 and positioned between a radiator 11 and an engine 12. A temperature responsive power element 13 extends outwardly from a cover 14 of the fan assembly into the path of travel of heated air passing through radiator 11. A fan hub 15, having blades 16 thereon, is mounted for rotation upon a drive shaft 18 mounted upon an engine driven shaft 17. Shaft 17 is illustrated as being a water pump shaft for driving a water pump indicated at 20. Water pump 20 serves the usual function of circulating cooling fluid through hose 21, radiator 11 and hose 22.

Referring more particularly to FIGURE 2, fan drive shaft 18 is shown as recessed at 23 to receive the end of water pump drive shaft 17. A series of bolts 24 serve to secure a flange 25 on shaft 18 to a flange 26 on shaft 17. The fan assembly may be quickly and economically assembled to shaft 17, and may easily be removed from shaft 17 for servicing or other purposes.

A fan hub 15, which also functions as a clutch housing is shown in section in FIGURES 2 and 8. Hub 15 is designed to be die cast of a material having good heat transfer characteristics such as aluminum. In the assembly of FIGURE 2, a roller bearing 27 supports the fan clutch hub housing 15 for rotation on fan drive shaft 18. Fan clutch hub housing 15 is shaped to provide four equally spaced threaded hollow bosses 28 to receive fan blade mounting bolts 29 (see FIG. 2) for mounting fan blades 16 to the housing. A series of four equally spaced threaded bosses 30 are provided on housing 15 and are adapted to receive bolts 31 whereby a cover 14 may be detachably secured to the housing 15. Cover 14 may be quickly and easily removed from housing 15 to provide ready access to the clutch drive and drum members for service purposes.

Figure 10:
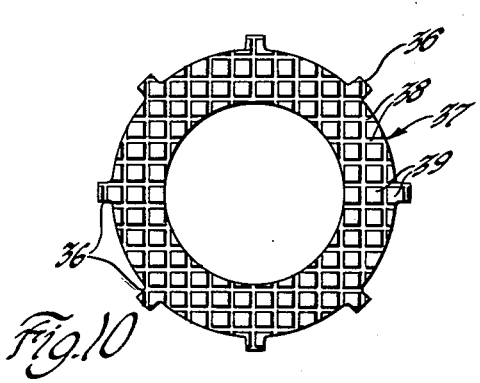
FIGURE 10 is an end view of a driven clutch disc.
Figure 11:
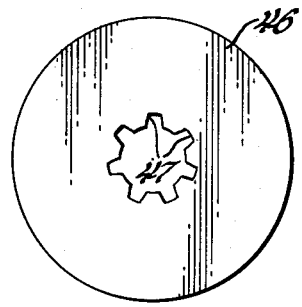
FIGURE 11 is an end view of a driving clutch disc.

Fan hub clutch housing 15 is shaped to provide a clutch chamber indicated generally at 32 in FIGURE 8, a bearing receiving chamber 33 adapted to receive the bearing 27, and is provided with an annular flange 34 whereby bearing 27 is retained in assembled relationship in the fan clutch hub housing. At the periphery of clutch chamber 32, the housing 15 is provided with a series of equally spaced square notches 35, there being eight such notches. Each notch 35 is adapted to receive a tab 36 of a driven clutch plate 37 shown in FIGURE 10, such that the clutch plates 37 may be axially movable with respect to clutch hub 15, but must rotate with the hub. As shown further in FIGURE 10, each driven clutch plate 37 is formed of metal, the friction surface of each plate 37 being formed with a series of square grid grooves 38 so that the friction surface comprises a series of square grids 39. In the assembly, clutch chamber 32 is at least partially filled with oil. Grooves 38 provide oil conducting paths whereby oil may escape from the clutch engaging friction surfaces during the interval of clutch engagement and also provide oil conducting channels whereby oil is permitted to act as a coolant and lubricant during periods wherein the clutch may be continuously operating with the clutch friction surfaces in slipping engagement. As shown in FIGURE 8, clutch hub 15 is provided with an annular recess 40 forming a spring seat shoulder for a diaphragm type spring.

Figure 9:
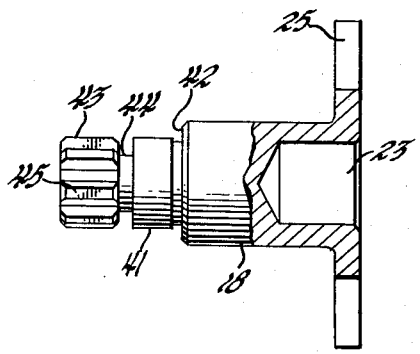
FIGURE 9 is a side elevation of the drive shaft.

In FIGURE 9, the clutch drive shaft 18 is shown as having mounting flange 25, recess 23, a bearing support section 41 of reduced diameter from that section carrying flange 25 to provide a shoulder 42 adapted to abut a race of bearing 27 and having a splined section 43 of reduced diameter. A notch 44 is adapted to receive a bearing retainer (not shown) so that the bearing 27 is held in the assembly between flange 34 of housing 15, abutment 42, and the bearing retainer in groove 44. Seven splines 45 on section 43 are adapted to receive cooperating splines 47 on a drive clutch plate 46. In the assembly there are four drive clutch discs 46 and five driven clutch discs 37. Each drive clutch disc 46 comprises a metal disc having smooth surfaces at opposite sides of the discs.

As shown in FIGURES 1, 6, 7 and 8, clutch housing 15 is provided with two sets of cooling fins 48 and 49. A set of cooling fins 48 on clutch housing 15 are equally spaced and extend radially outwardly from the front surface of clutch hub housing 15 beyond the periphery of the main body of the housing. There are forty-eight such fins designated by the numeral 48. A second set of cooling fins 49 are formed on the rear portion of housing 15 in the zone of bearing 17 and rearwardly from clutch chamber 32. A total of twenty-eight heat radiating fins 49 are provided at the inner zone of clutch hub housing 15, the fins extending axially rearwardly of clutch chamber 32 and radially outwardly from the bearing receiving portion in which bearing 27 is retained. The provision of fins 48 on the forward surface in the outer radial zone of housing 15 and the fins 49 in the inner radial zone of the housing 15 at the rear of the housing assures very rapid heat transfer to the air flowing past the housing.

Die cast cover 14, shown in FIGURES 1, 3 and 4 through 6, is formed of a material having good heat conducting characteristics such as aluminum, and is provided with a thin main wall 50 having two sets of upstanding fins 51 and 52 formed thereon. A total of sixteen fins 51 are formed on wall 50, the fins 51 all extending outwardly radially from the inner radial zone of wall 50. Eight fins 51 are contained within the outer periphery of wall 50, and eight of the fins 51 extend radially outwardly beyond the periphery of wall 50. The second set of fins 52 are each disposed between an adjacent fin 51 and extend radially outwardly beyond the outer periphery of wall 50. Fins 51 and 52 are thin and extend outwardly vertically from the surface of wall 50 a distance which is at least three times the thickness of wall 50 to provide a large area of upstanding metal subject to air flow for rapid heat transfer.

As shown particularly in FIGURE 5, cover 14 is provided with a central boss 53 threaded at 54 and adapted to receive a temperature responsive power actuator 55 shown in FIGURE 1. In the assembly shown in FIGURE 1, power actuator 55 is provided with a plunger 56 adapted to contact a cup member 57 carried by a diaphragm spring 58 seated upon recess 40 of fan clutch hub housing 15. An axially movable presser plate 59 is disposed between diaphragm spring 58 and one of the driven clutch plates 37. Cup 57 is provided with a series of openings 60, shown particularly in FIGURE 6 to permit free flow of oil from one side of diaphragm spring 58 to the other. Also shown in FIGURE 6 are eight equally spaced grooves 61 at the outer periphery of clutch chamber 32 to permit passage of oil past the outer periphery of diaphragm spring 58. Passages 60 and 61 are necessary in order to assure that oil will be contained at opposite sides of diaphragm 60 such that no resultant thrust in any axial direction will be applied to the diaphragm as a result of centrifugal force applied to the oil when the clutches are effective to drive the fan blades.

Figure 12:
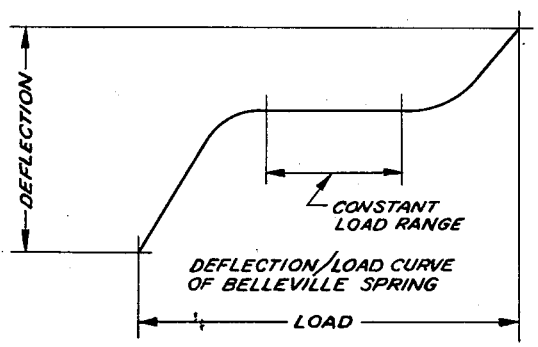
FIGURE 12 is a diagram illustrating the deflection-load characteristics of the Belleville spring.

Temperature responsive pellet type motor 55 is of a well known type in which the plunger 56 will move to the right as viewed in FIGURE 1 upon a rise in temperature of motor 55. Motor 55 is subjected to heated air from radiator 11 as shown in FIGURE 1 and is responsive to cooling requirements as a function of the temperature of the air passing over the motor. When the air is cool, plunger 56 will move to the left as viewed in FIGURE 1, to release the clutch plates 37—46 so that no fan drive is had. This permits rapid engine warm-up when starting with a cold engine. As the air flowing over the pellet section of motor 55, warms up by taking on heat from radiator 11, the plunger 56 applies force to cup 57 and diaphragm spring 58, the spring being effective to transmit force through presser plate 59 tending to engage the clutch discs. As shown in FIGURE 12, which is a deflection-load curve for the Belleville spring 46, spring 46 is calibrated to load the clutch plates to a predetermined maximum load when the motor plunger 56 is at its maximum stroke such that the clutch plates are capable of transmitting only a limited torque to drive the fan. More specifically, the maximum stroke of the pellet type motor causes the Belleville spring 58 to operate in the "constant load range" indicated in FIGURE 12, the spring 58 being calibrated to apply limited clutch engaging pressure to the clutch plates. In the preferred embodiment, spring 58 is capable of applying force to clutch plates 37—46 to limit the torque transmitting capacity of the clutch such that the fan may not be driven at a speed greater than a predetermined speed, for example, 1500 r.p.m. In the event that shaft 18 is rotated at speeds above the predetermined speed, for example 1500 r.p.m., there will be continual slippage of clutch plates 37—46 even though the motor 55 is at its maximum stroke and exerting maximum force on spring 58. The fan blades will never rotate at a speed of rotation higher than 1500 r.p.m. irrespective of the speed of rotation of shaft 18.

In the event that pellet motor 55 is heated such that the plunger 56 is not fully extended, but is only partially extended, the clutch applying force will be limited to less than maximum and may permit the fan to rotate at a slower speed than shaft 18 even though shaft 18 is rotating at less than the maximum speed of 1500 r.p.m. In the event that the cooling requirements are high enough to cause the pellet motor to move plunger 56 to its maximum stroke when the shaft 18 is rotating at less than the predetermined speed of 1500 r.p.m., the clutch plates will be fully engaged and the fan will rotate at the speed of rotation of shaft 18. As the shaft 18 exceeds 1500 r.p.m., the clutches will slip such that the fan speed will be limited to 1500 r.p.m.

It has been found that the arrangement described provides adequate cooling under maximum cooling demand even though the fan blades are never driven faster than the predetermined speed of 1500 r.p.m. This limiting of maximum fan speed greatly reduces fan noise and also reduces power consumed in driving the fan, thereby contributing to economy in the form of greater miles per gallon of fuel. At times when cooling demands are limited, as in the winter, the fan may be continuously driven at less than the maximum speed of 1500 r.p.m., further reducing fan noise and power consumed in driving the fan. A long and useful clutch life is obtained as a result of the relatively light loading of the clutch discs and the rapid heat dissipation resulting from the large fin area provided on the cover and fan hub clutch housing. The oil circulating passages described in connection with the clutch disc 37 and for permitting oil flow around the exterior portion of diaphragm spring 58 and through cup 57 permit the oil to act as a heat transmitting agent to assist in cooling the clutch discs. The arrangement wherein the fan hub clutch housing, clutch elements, and power means for controlling the clutches are all mounted upon the drive shaft is compact, simple, and inexpensive to install and disassemble for purposes of repair.

It will be understood that due to the limited maximum clutch applying force that may be applied to presser plate 59 through diaphragm spring 58 when plunger 56 is at the limit of its range of travel inwardly through cover 14 that the torque transmitting capacity of the clutch discs is limited. The clutch engaging force is calibrated such that the load applied to the fan hub by blades 16 will cause the clutch discs to slip when the speed of rotation of the fan hub reaches the predetermined maximum permissible speed of 1500 r.p.m.

In the event that plunger 56 is disposed at a position less than the end of its maximum stroke into cover 14, less force will be applied to clutch discs 37—46 and slippage of the discs may occur at a lesser speed of rotation of hub 14 than the maximum permissible speed of rotation of the hub. In the event that power element 55 is cool and plunger 56 is positioned at its minimum stroke, the clutch discs will be released and fan hub 15 will idle on shaft 18. The provision of the fins 49 and 48 on hub 15 and fins 51 and 52 on cover 50, together with the oil passages in the clutch plates and for free flow of oil from the clutch chamber to the cover permit the oil to conduct heat away from the bearing and clutch discs and to the chamber between the diaphragm spring and internal surface of the cover. These features all contribute to a fan drive wherein the clutch discs may be continuously operated in slipping friction engagement and have a long and useful clutch life. The design provides for continuous operation of the fan hub 15 at a speed less than the speed of rotation of drive shaft 18 at speeds lower than the maximum permissible speed in the event that cooling requirements are light. Thus, in the speed range of shaft 18 between zero and 1500 r.p.m., hub 15 may be continuously driven at a speed less than that of shaft 18, depending upon the position of plunger 56 in its path of travel. The fan is only driven at sufficient speed to meet the cooling requirements. In any event, the speed of rotation of the fan hub 15 is limited to a predetermined maximum speed. Thus if shaft 18 is rotating at a speed greater than the maximum permissible speed of 1500 r.p.m., for example, and plunger 56 is at its maximum stroke, the diaphragm spring 58 will transmit only a limited force to presser plate 59 whereby the torque transmitting capacity of the clutch discs is limited as explained.

I claim:

1. A friction drive comprising an engine driven drive shaft, a drive unit having a hub supported for rotation upon said drive shaft, means driven by said hub subjecting said hub to an increasing load as the speed of rotation of said hub increases, friction engaging members within said drive unit for transmitting torque from said drive shaft to said hub, a temperature responsive power actuator carried by said drive unit and having an actuator element extending into said unit, said actuator element being movable through a limited range of motion in response to variation of temperature of said actuator, means for transmitting force from said movable element to said friction engaging members, said force transmitting means being normally effective to bias said actuator element to a retracted position to release said friction engaging members, said force transmitting means being effective in a first range of motion of said movable element to transmit full force from said movable element to said friction engaging members, said force transmitting means cooperating with said movable element in a second range of movement of said movable element to apply a limited force to said friction engaging members, said friction members being retained in non-slipping engagement when the speed of said drive shaft is below a predetermined maximum speed of rotation and in slipping frictional engagement when the speed of rotation is greater than said predetermined maximum speed of rotation to limit the maximum speed of rotation of said hub to said predetermined maximum speed.

2. A friction drive comprising an engine driven drive shaft, a hub, means supporting said hub for rotation upon said drive shaft, means driven by said hub subjecting said hub to an increasing load in response to increase in speed of rotation of said hub, a first set of clutch members rotatable with said drive shaft, a second set of clutch members rotatable with said hub and adapted to frictionally engage said first set of clutch members to transmit torque from said drive shaft to said hub, a cover carried by said hub, a temperature responsive power element carried by said cover and having a movable member extending through said cover into said clutch hub, force transmitting means for transmitting force from said movable member to said clutch members, said movable member being movable through a limited range of motion, said force transmitting means being normally effective to bias said movable member to a retracted position to release said clutch members, the force applied to said clutch members being limited by said force transmitting means such that the speed of rotation of said hub is limited to a predetermined maximum speed and said friction members are retained in slipping frictional contact when the speed of rotation of said drive shaft exceeds said maximum speed and said movable member is positioned at one extremity of its range of motion.

3. A friction drive comprising, an engine driven drive shaft, a hub supported upon said drive shaft and rotatable with respect to said drive shaft, means driven by said hub subjecting said hub to an increasing load in response to increase in speed of rotation of said hub, a set of clutch discs driven by said drive shaft, a set of clutch discs rotatable with said hub, said sets of clutch discs being disposed within said hub and adapted to be engaged and released, a cover carried by said hub, a temperature responsive power actuator carried by said cover and having an element movable through a limited range of motion in response to changes of temperature of said power actuator, means for transmitting force from said movable element to said clutch discs for engaging said clutch discs, said force transmitting means being normally effective to bias said movable element to a retracted position to release said clutch discs when said power actuator is relatively cool, said force transfer means being effective when said movable element has been moved to the limit of its range of motion to limit the maximum clutch engaging pressure applied to said clutch discs to thereby limit the maximum speed of rotation of said hub to a predetermined maximum speed less than the maximum speed of rotation of said drive shaft irrespective of rise of temperature of said power actuator.

4. A friction drive comprising an engine driven drive shaft, a hub, means supporting said hub for rotation upon said drive shaft, means driven by said hub subjecting said hub to increasing load in response to increase in speed of rotation of said hub, means for transmitting torque from said drive shaft to said hub comprising clutch discs driven by said drive shaft and clutch discs rotatable with said clutch drum and adapted to frictionally engage said first mentioned clutch discs, a temperature responsive power element having an actuator member movable throughout a range of travel in response to change of temperature of said power element, a force transmitting element for transmitting force from said actuator member to said clutch discs for disposing said clutch discs in frictional contact with each other, said actuator member and said force transmitting member being effective when said actuator member is at one end of its range of travel to release said clutch discs, said force transmitting member being effective during one portion of the range of travel of said actuator member to transmit full force from said actuator member to said clutch discs and effective during a second portion of the range of travel of said actuator member to limit the maximum force applied to said clutch discs tending to engage the same irrespective of the position of said actuator member in said second portion of its range of travel, said clutch discs being retained in frictional slipping engagement to limit the maximum speed of rotation of said hub to a predetermined maximum speed when the speed of rotation of said drive shaft exceeds said predetermined maximum speed irrespective of rise of temperature of said temperature responsive power element, said force transmitting element being effective to bias said actuator element to a retracted position to release said clutch discs when said power element is relatively cool.

5. A friction drive comprising an engine driven drive shaft, a clutch hub having fan blades supported thereon, means supporting said hub for rotation upon said drive shaft, a chamber in said hub adapted to receive a plurality of clutch discs, a first set of clutch discs disposed in said chamber and driven by said drive shaft, a second set of clutch discs in said chamber rotatable with said clutch hub and adapted to frictionally engage and to be released from said first set of clutch discs, a presser plate in said chamber, a diaphragm spring at one end of said chamber and seated upon said hub, a detachable cover carried by said hub, and a temperature responsive power element carried by said cover and having a plunger extending through said cover into contact with said diaphragm spring, said plunger being movable throughout a limited range of motion in response to variation of the temperature of said power element, said plunger being effective when said power element is relatively cool to permit said clutch discs to be released, said diaphragm spring being effective when said plunger is moved through a first portion of said range of travel to transmit full force from said plunger to said discs and effective upon movement of said plunger through a second portion of its range of travel and positioned at the limit of its range of travel in response to rise in temperature of said power element to transmit limited force to said presser plate, said clutch discs being capable of transmitting limited torque from said drive shaft to said clutch hub when said plunger is in said last-mentioned position to limit the maximum speed of rotation of said clutch hub to a predetermined speed when the speed of rotation of said drive shaft exceeds said predetermined speed irrespective of rise of temperature of said temperature responsive power element.

6. A friction drive comprising an engine driven drive shaft, a clutch hub having fan blades secured thereto, means supporting said clutch hub for rotation upon said drive shaft, a chamber in said clutch hub adapted to receive a plurality of clutch discs, a coolant in said chamber, a first set of clutch discs disposed in said chamber and driven by said drive shaft, a second set of clutch discs in said chamber rotatable with said clutch hub adapted to frictionally engage and to be released from said first set of clutch discs, a presser plate in said chamber, a diaphragm spring seated on said housing at one end of said chamber, a cover carried by said housing and forming a second chamber between said diaphragm spring and said cover, cooling fins on said cover, passages for permitting transfer of said coolant between said chambers, a temperature responsive power element carried by said cover having a plunger extending through said cover into contact with said diaphragm spring, said plunger being movable through a limited range of travel in response to change of temperature of said power element, said plunger being effective at one end of its range of travel to permit said clutch discs to be released, said diaphragm spring being effective when said plunger is at the opposite end of its range of travel to transmit limited force to said presser plate whereby said clutch discs are retained in frictional slipping engagement when the speed of rotation of said drive shaft exceeds a predetermined speed to limit the maximum permissible speed of rotation of said clutch hub to said predetermined speed irrespective of the speed of rotation of said drive shaft at speeds above said predetermined speed irrespective of rise of temperature of said temperature responsive power element.

7. A friction drive comprising an engine driven drive shaft, a clutch hub having fan blades secured thereto, a bearing supporting said clutch hub for rotation upon said drive shaft, a chamber in said clutch hub adapted to receive a plurality of clutch discs, a first set of clutch discs disposed in said chamber and driven by said drive shaft, a second set of clutch discs disposed in said chamber rotatable with said clutch hub adapted to frictionally engage and to be released from said first set of clutch discs, a set of fins formed on the external surface of said clutch hub protruding radially outwardly from said bearing and axially rearwardly of clutch discs for radiating heat from said clutch hub, a lubricant in said chamber for lubricating said clutch discs and bearing and for conducting heat away from the same, a presser plate in said chamber, a diaphragm spring seated on the clutch hub at one end of said chamber and adapted to contact said presser plate, a cover carried by said clutch hub and forming a second chamber between said diaphragm spring and said cover, passages permitting flow of said lubricant from said first-mentioned chamber to said second chamber, a plurality of cooling fins on the external surface of said cover for radiating heat from said cover, a temperature responsive power element mounted on said cover having a plunger extending through said cover into contact with said diaphragm spring, said plunger being movable through a limited range of motion in response to temperature variation of said power element, said plunger and diaphragm spring being effective to release said clutch discs when said plunger is disposed at one end of its range of travel, said diaphragm spring being effective when said plunger is moved through a first portion of its range of travel to transmit full force to said clutch discs and effective when said plunger is moved through a second portion of its range of travel and when said plunger is disposed at the opposite end of its range of travel to transmit limited force to said presser plate whereby said clutch discs are retained in slipping engagement to limit the maximum speed of rotation of said clutch hub irrespective of the speed of rotation of said drive shaft at speeds above said predetermined speed irrespective of rise of temperature of said temperature responsive power element.

8. A friction drive unit comprising a power input membed adapted to be driven at variable speeds of rotation, a power delivery unit adapted to be driven by said power input member, means driven by said power delivery unit subjecting said power delivery unit to increasing load in response to increase in the speed of rotation of said power delivery unit, friction members for transmitting torque from said power input unit to said power delivery unit, a temperature responsive power actuator having an element movable through a range of motion in response to rise in temperature of said power actuator, force transmitting means for transmitting force from said movable element to said friction members, said force transmitting means being effective in a first portion of said range of motion of said movable element to transmit full force from said movable element to said friction members, said force transmitting means being effective to limit the force applied to said friction members to maintain said friction members in continuous slipping engagement when said movable element is moved through a second portion of its range of motion and when said movable element is positioned at one extremity of its range of travel and the speed of rotation of said power input member exceeds a predetermined speed of rotation, said force transmitting means being normally effective to bias said movable element to a retracted position to release said friction members when said temperature responsive power actuator is relatively cool.

9. A friction drive assembly comprising a power input member adapted to be driven at variable speeds of rotation, a power delivery member adapted to be driven at variable speeds of rotation with respect to the speed of rotation of said power input member, means driven by said power delivery member subjecting said power delivery member to an increasing load as the speed of rotation of said power delivery member increases, friction members adapted to be engaged to transmit torque from said power input member to said power delivery member and to be released to disconnect said power input member from said power input member, a temperature responsive power actuator having a movable element movable in response to change in temperature of said power actuator and movable through a predetermined range of travel, means for transmitting force from said movable element to said friction members and tending to engage the same, said force transmitting means and said movable element cooperating to maintain said friction members in non-slipping engagement when said movable element is positioned at one end of its range of motion and the speed of rotation of said power input member is less than a predetermined speed of rotation, said force transmitting means being effective to limit the force applied to said friction members by said movable element and cooperating with said movable element to maintain said friction members in continuous slipping engagement to limit the speed of rotation of said power delivery member to a maximum speed of rotation when said movable element is positioned at said one end of its range of travel and the speed of rotation of said power input member exceeds said predetermined speed of rotation, said force transmitting means being normally effective to bias said movable element to a retracted position to release said friction members when said temperature responsive power element is relatively cool.

10. A friction drive unit comprising a power input member adapted to be driven at variable speeds of rotation, a power delivery unit adapted to be driven by said power input member, engageable and releasable friction discs for transmitting torque from said power input member to said power delivery unit, a temperature responsive power unit normally effective to generate a force which increases with increase of temperature of said power unit, means for transmitting force from said power unit to said discs including a deflectable force transmitting member, said force transmitting member being normally effective to bias said power unit to release said friction discs when the temperature of said power unit is less than a predetermined temperature, said force transmitting member being effective in a first temperature range of said power unit to increase the force applied to said discs in response to rise of temperature of said temperature responsive power unit, said force transmitting member being effective in a second temperature range of said power unit to deflect to thereby maintain a constant limited pressure on said discs irrespective of rise of temperature of said temperature responsive power unit to limit the maximum speed of rotation of said power delivery unit to a speed less than the maximum speed of rotation of said power input member.

11. A friction drive unit comprising a power input member adapted to be driven at variable speeds of rotation, a power delivery unit adapted to be driven by said power input member, means driven by said power delivery unit subjecting said power delivery unit to increasing load in response to increase in the speed of rotation of said power delivery unit, engageable and releasable friction discs for transmitting torque from said power input member to said power delivery unit, a temperature responsive power unit including an element movable through a range of motion from a retracted position when said power unit is cold to a fully extended position in response to rise of temperature of said power unit, a deflectable force transmitting member disposed between said movable element and said discs for transmitting clutch engaging force from said power element to said discs for engaging said discs, said deflectable element being normally effective to bias said movable element to release said friction discs when said power unit is cold, said deflectable element being effective in a first range of motion of said movable element to increase the clutch engaging force applied to said discs in response to movement of said movable element, said deflectable element being effective in a second range of movement of said movable element to deflect to prevent increase of clutch engaging pressure irrespective of movement of said movable element in said second range of motion to thereby limit the maximum speed of rotation of said power delivery unit to a maximum speed less than the maximum speed of said power input member.

12. A friction drive unit comprising a power input member adapted to be driven at variable speeds of rotation, a power delivery member adapted to be driven by said power input member, means driven by said power delivery member subjecting said power delivery member to an increasing load as the speed of rotation of said power input member increases, a temperature responsive power unit subjected to variable temperature and including a movable element movable from a retracted position through a range of travel to a fully extended position in response to rise of temperature of said temperature responsive power unit, engageable and releasable friction discs for transmitting torque from said power input member to said power delivery member, means for transmitting force from said movable element to said discs for frictionally engaging said discs including a deflectable force transmitting member normally effective to bias said movable element to said retracted position to release said friction discs, said force transmitting members being effective in a first range of travel of said movable element to increase the force applied to said friction discs as said movable element moves toward said fully extended position, said deflectable element being deflected in response to movement of said movable element beyond said first range of movement toward said fully extended position to maintain a constant pressure on said friction discs to limit the torque transmitting capacity of said discs, the load applied to said power delivery member at a predetermined speed of rotation of said power delivery member being greater than the torque transmitting capacity of said discs whereby the maximum speed of rotation of said power delivery member is limited to said predetermined speed irrespective of further increase in speed of rotation of said power input member.

13. A friction drive unit comprising a power input member adapted to be driven at variable speeds of rotation, a power delivery unit adapted to be driven by said power input member, engageable and releasable friction discs for transmitting torque from said power input member to said power delivery unit, means driven by said power delivery unit subjecting said power delivery unit to an increasing load in response to increase in speed of rotation of said power delivery unit, a temperature responsive power unit including an element movable from a retracted position when said power unit is cold to a fully extended position in response to rise of temperature of said power unit, a deflectable force transmitting member disposed between said movable element and said discs for transmitting force from said movable element to said discs to engage the same, said deflectable member normally being effective to bias said movable element to said retracted position to release said friction discs when said power unit is cold, said deflectable member being effective in a first range of movement of said movable element toward said extended position to transmit increasing force to said discs in response to movement of said movable element, said deflectable member being effective in a second range of motion of said power element toward said extended position to deflect to limit the force applied to said discs irrespective of further rise of temperature of said power element whereby said discs are maintained in continuous slipping engagement to limit the maximum speed of rotation of said power delivery unit to a speed less than the maximum speed of rotation of said power input member.

14. A friction drive unit comprising a power input member adapted to be driven at variable speeds of rotation, a power delivery member adapted to be driven by said power input member, a stacked assembly of engageable and releasable friction discs for transmitting torque from said power input member to said power delivery member, a temperature responsive power unit carried by said power delivery member and subjected to variable temperature, said power unit including a movable element movable from a retracted position when said power unit is cold through a range of movement to a fully extended position in response to rise of temperature of said power element, means for transmitting force from said movable element to said friction discs comprising a Belleville spring pivoted on one of said members and movable about its pivot in response to movement of said movable element, said Belleville spring being normally effective to bias said movable element to said retracted position to release said friction discs when said power unit is cold, said Belleville spring being effective in a first range of movement of said movable element toward said extended position to increase the force applied to said discs in response to movement of said movable element towards its extended position, said Belleville spring being effective in a second range of movement of said movable element towards said extended position to limit the force applied to said discs to a predetermined force irrespective of further movement of said movable element towards its fully extended position to limit the maximum speed of rotation of said power delivery member to a speed less than the maximum speed of rotation of said power input member.

15. A friction drive unit comprising a power input member adapted to be driven at variable speeds of rotation, a power delivery member adapted to be driven by said power input member, a stacked assembly of engageable and releasable friction discs for transmitting torque from said power input to said power delivery member, a temperature responsive power unit carried by said power delivery member and subjected to variable temperature, said power unit including a movable element movable from a retracted position when said power unit is relatively cool to a fully extended position in response to rise of temperature of said power unit, means for transmitting force from said movable element to said friction discs comprising a Belleville spring pivoted on one of said members and normally effective to bias said movable element to its retracted position when said temperature responsive power element is relatively cool to release said friction elements from frictional engagement, said Belleville spring being effective upon movement of said movable element in a first range of movement towards its extended position to increase the force applied to said friction discs and tending to engage the same, said Belleville spring being effective in a second range of movement of said movable element towards its fully extended position to deflect to limit the force applied to said friction discs whereby said discs are maintained in slipping frictional engagement to limit the maximum speed of rotation of said power delivery member to a predetermined maximum speed less than the maximum speed of rotation of said power input member irrespective of rise of temperature of said temperature responsive power element.

16. A friction drive unit comprising a power input shaft adapted to be driven at variable speeds of rotation, a housing enclosing a chamber and supported for rotation upon said shaft, means driven by said housing subjecting said housing to an increasing load as the speed of rotation of said housing increases, a stacked assembly of engageable and releasable discs disposed in said housing for transmitting torque from said shaft to said housing, a detachable cover secured to said housing for rotation therewith, a temperature responsive power unit mounted on said cover external of said chamber and subjected to air flow of variable temperature, said power unit including a plunger extending through said cover into said chamber, said plunger being movable through a range of motion from a fully retracted position when said power unit is relatively cool to a fully extended position when said power unit is relatively hot, a Belleville spring pivoted on said housing and operatively connected to said plunger, said Belleville spring being effective to move said plunger towards its fully retracted position as the temperature of said power unit decreases to effectuate release of said discs when said plunger is disposed in said fully retracted position, said plunger being effective in a first range of motion from its fully retracted position towards its fully extended position to move said Belleville spring about its pivot to apply a force to said discs which increases in response to movement of said plunger towards said extended position, said Belleville spring being effective in a second range of motion of said plunger to deflect to apply a constant force to said discs irrespective of further movement of said plunger towards said fully extended position to limit the torque transmitting capacity of said discs, the load applied to said housing at a predetermined speed of rotation of said housing being greater than the torque transmitting capacity of said discs whereby the maximum speed of rotation of said housing is limited to said predetermined maximum speed irrespective of speeds of rotation of said power input shaft at speeds above said predetermined maximum speed.

17. A friction drive unit comprising a power input shaft adapted to be driven at variable speeds of rotation, a housing rotatably supported on said shaft, means driven by said housing subjecting said housing to an increasing load as the speed of rotation of said housing increases, a cover secured to said housing for rotation therewith, said housing and cover providing a closed chamber, fluid in said chamber, means disposed in said chamber for transmitting torque from said shaft to said housing comprising a stacked assembly of clutch discs disposed in said chamber, a temperature responsive power unit mounted on said cover external of said chamber and subjected to variable temperature, said power element including an axially movable plunger movable from an initial retracted position when said temperature responsive power element is relatively cool through a range of movement to a fully extended position when said temperature responsive power element is relatively hot, means for transmitting force from said plunger to said discs for establishing frictional contact of said discs including a diaphragm spring pivoted on said housing and normally effective to apply a force on said plunger tending to bias said plunger towards said retracted position to release said clutch discs when said power unit is relatively cool, a central opening through said diaphragm spring, means operatively connecting said diaphragm spring to said plunger, a series of openings through said last mentioned means for permitting fluid flow from one side of said diaphragm spring to the opposite side of said spring, a series of openings in said housing external of the outer periphery of said diaphragm spring for permitting fluid flow from one side of said diaphragm spring to the opposite side of said spring, said openings being effective to permit fluid flow irrespective of the condition of engagement or release of said clutch discs, said diaphragm spring in a first range of movement of said plunger being effective to transmit force to said discs which increases in response to movement of said plunger towards its fully extended position, said diaphragm spring being deflected in a second range of movement of said plunger towards said fully extended position to limit the force applied to said discs to thereby limit the torque transmitting capacity of said discs, the load applied to said housing at a predetermined speed of rotation of said housing being in excess of the torque transmitting capacity of said discs whereby the speed of rotation of said housing is limited to said predetermined speed irrespective of the speed of rotation of said power input shaft at speeds above said predetermined speed and irrespective of rise of temperature of said power unit.

References Cited in the file of this patent

UNITED STATES PATENTS

| | | |
|---|---|---|
| 1,122,020 | Michaelson | Dec. 22, 1914 |
| 1,233,518 | Snyder | July 17, 1917 |
| 2,005,468 | Modine | June 18, 1935 |
| 2,452,264 | Russell | Oct. 26, 1948 |
| 2,570,515 | Bonham | Oct. 9, 1951 |
| 2,661,148 | Englander | Dec. 1, 1953 |
| 2,675,899 | Bonham | Apr. 20, 1954 |
| 2,786,456 | Heiss | Mar. 26, 1957 |
| 2,838,244 | Oldberg | June 10, 1958 |
| 2,840,315 | Heiss | June 24, 1958 |
| 2,879,755 | Weir | Mar. 31, 1959 |
| 2,881,890 | Welch | Apr. 14, 1959 |
| 2,890,687 | Richmond | June 16, 1959 |
| 2,902,127 | Hardy | Sept. 1, 1959 |
| 2,948,268 | Roper et al. | Aug. 9, 1960 |
| 2,963,135 | Weir | Dec. 6, 1960 |
| 2,983,124 | Spase | May 9, 1961 |